United States Patent [11] 3,583,514

| [72] | Inventor | James C. Taylor |
| | | 905 Katherine Place, Oklahoma City, Okla. 73114 |
| [21] | Appl. No. | 823,582 |
| [22] | Filed | May 12, 1969 |
| [45] | Patented | June 8, 1971 |

[54] AUTOMATIC GUIDANCE SYSTEM FOR FARM TRACTORS AND METHOD OF PLOWING
20 Claims, 14 Drawing Figs.

| [52] | U.S. Cl.................................................. | 180/79, 56/10, 172/3 |
| [51] | Int. Cl................................................... | B62d 5/00 |
| [50] | Field of Search........................................ | 180/79, 79.1, 79.2; 104/244.1; 56/DIG. 15, 10; 172/5, 7, 9, 3 |

[56] References Cited
UNITED STATES PATENTS

| 2,981,355 | 4/1961 | Rabuse........................ | 56/DIG. 15 |
| 3,326,319 | 6/1967 | Schmidt...................... | 56/DIG. 15 |
| 3,387,665 | 6/1968 | Fischer et al. ............... | 180/79.1 X |
| 3,430,723 | 3/1969 | Brooks........................ | 56/DIG. 15 |
| 3,472,322 | 10/1969 | Barry........................... | 180/79.1 |

*Primary Examiner*—Benjamin Hersh
*Assistant Examiner*—John A. Pekar
*Attorney*—Dunlap, Laney, Hessin & Dougherty ABSTRACT: An automatic guidance system for farm tractors including a first sensing device for sensing plowed as contrasted with unplowed land, a second sensing device for sensing unplowed land as contrasted with plowed land and spaced from the first sensing device in a transverse direction with respect to a straight line of forward travel of a tractor on which the sensing devices are mounted, and a third sensing device located forwardly of the first and second sensing devices (in relation to the tractor) for sensing plowed land as contrasted with unplowed land. Control devices interconnect the steering mechanism of the tractor with the first and second sensing devices and are responsive to signals developed by these sensing devices to steer the tractor along a line of travel adjacent the edge of a field being plowed. Another control device interconnects the third sensing device with the braking system and steering mechanism of the tractor to pivot the tractor about one rear wheel in response to a signal developed by the third sensing device. The invention also relates to a method of plowing by the use of this system.

PATENTED JUN 8 1971

INVENTOR.
JAMES C. TAYLOR

BY
Dunlap, Laney, Hessin & Dougherty
ATTORNEYS

INVENTOR.
JAMES C. TAYLOR
BY
Dunlap, Laney, Hessin & Dougherty
ATTORNEYS

INVENTOR.
JAMES C. TAYLOR

BY
Dunlap, Laney, Hessin & Dougherty
ATTORNEYS

INVENTOR
JAMES C. TAYLOR

AUTOMATIC GUIDANCE SYSTEM FOR FARM TRACTORS AND METHOD OF PLOWING

BACKGROUND OF THE INVENTION

1. Field of the Invention

This invention relates to agricultural implements, and more particularly, to an automatic guidance system for farm tractors and the like.

2. Brief Description of the Prior Art

Many types of steering aids and automatic steering structures for use on farm tractors have heretofore been proposed. Most of these devices function to guide the tractor along a relatively straight path of travel and many of them include mechanism for sensing the departure of the tractor from alignment with, or travel parallel to, a plowed furrow. When such departure occurs, a signal is transmitted to mechanism which actuates the steering mechanism to return the tractor to the desired path of travel. Automatic guidance structures of the type described function fairly well when a continuous straight furrow is available as a reference or base line, or when there is no concern for automatically negotiating curves, or rounding corners. The apparatus presently available is not effective for automatically guiding the tractor through this path of travel requiring the negotiation of right-angle turns, although a system for automatically guiding a lawn mower or three-wheeled harvester through a rectangular cutting pattern is described in U.S. Pat. No. 2,751,030. A furrow-following guidance system is disclosed in U.S. Pat. No. 3,395,771.

BRIEF DESCRIPTION OF THE PRESENT INVENTION

The present invention relates to an automatic guidance system for agricultural tractors of the type having a pair of large, horizontally spaced rear wheels, and structure for attaching a plow behind the tractor. The guidance system is adapted for guiding the tractor in a generally convex polygonal path of travel along the boundary between plowed and unplowed land. The system enables the tractor to make relatively sharp turns of 90° or more.

Broadly described, the automatic guidance system of the present invention comprises a supporting frame adapted for mounting on the forward portion of a farm tractor, first and second sensing devices spaced horizontally from each other along a line extending substantially normal to the straight forward direction of movement of the tractor, the first and second sensing devices being mounted on the supporting frame and each being capable of sensing a difference between plowed and unplowed land, and a third sensing device positioned forward of the first and second sensing devices and horizontally spaced therefrom. The third sensing device is also capable of differentiating plowed and unplowed land. The sensing devices are parts of a servosystem which also includes means connected between the steering and braking mechanism of the tractor, and the sensing devices, and functioning to translate signals developed by the sensing devices upon traversal of boundaries between plowed and unplowed areas into forces applying a brake of the tractor and/or turning the steering wheels to change the course of the tractor. This signal translation means may be a hydraulic system including valves which are thrown by the movements of mechanical feelers functioning as the sensing devices, or it may be an electrical or electronic system responsive to infrared or photocell-type sensing devices, or a combination of these systems. In a preferred embodiment of the invention, the automatic control system further includes means for compensating for anomalies in the terrain traversed by the tractor to prevent the development of spurious signals by the sensing devices, and preferably also includes means for reducing "hunting" or "Dutch wobble" by the tractor due to inherent time lags in responding to signals developed by the sensing devices.

An object of the invention is to provide an automatic guidance system for a farm tractor which is capable of directing the tractor along a boundary of plowed land, which boundary is of convex polygonal configuration.

An additional object of the invention is to provide a system capable of differentiating between plowed and unplowed ground, and of converting this capability into control forces used to control the path of travel of a farm tractor.

Another object of the invention is to provide an automatic guidance system which can turn a four-wheeled farm tractor through an angle of 90° while one rear wheel thereof remains substantially stationary.

Another object of the invention is to provide an automatic guidance system for guiding a farm tractor along a boundary between plowed and unplowed land, and which includes a sensing system which includes means for compensating for anomalies in the soil.

Additional objects and advantages will become apparent as the following detailed description of the invention is read in conjunction with the accompanying drawings.

DETAILED DESCRIPTION OF A PREFERRED EMBODIMENT OF THE INVENTION

Figure 1:
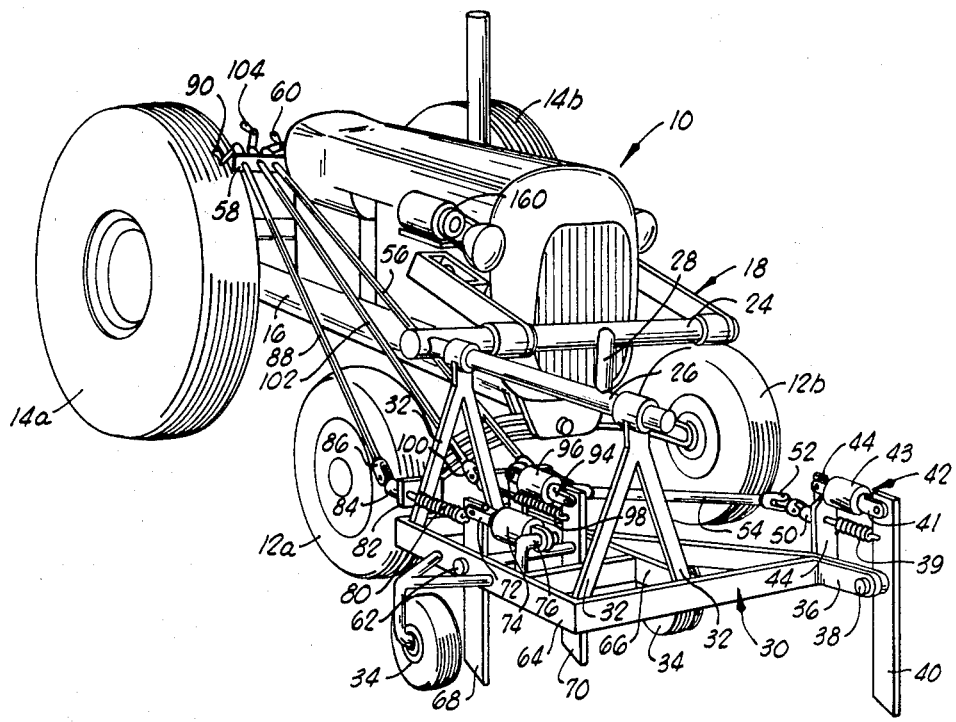
FIG. 1 is a perspective view of a farm tractor provided with one embodiment of the automatic guidance system of the present invention.
Figure 2:
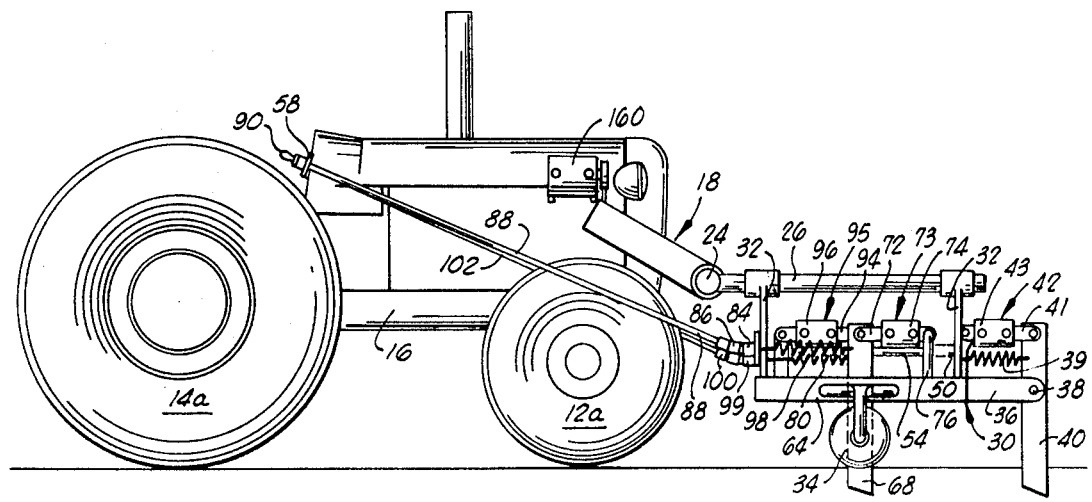
FIG. 2 is a side elevation view of the tractor and guidance system depicted in FIG. 1.

Referring initially to FIG. 1 of the drawings, shown therein is a farm tractor 10 having the usual front wheels 12a and 12b and rear wheels 14a and 14b. The tractor has a chassis 16, and secured to the chassis is a framework 18 which projects forwardly of the tractor and includes a horizontally extending crossbar 24, a forwardly and horizontally extending supporting bar 26 and associated diagonal brace 28, and a subframe 30 which is suspended from the supporting bar 26 by a plurality of straps 32. The subframe 30 preferably carries a pair of small ground wheels 34 which support the subframe 30 above the ground in conjunction with the support bar 26. It should be pointed out here that the framework 18 is rigidly secured to the chassis 16 of the tractor 10 so that the framework moves with the chassis and is retained in constant alignment therewith during operation of the tractor.

At its forward end, the subframe 30 carries a pair of forwardly projecting lugs 36 which contain aligned or registering apertures to receive a pivot pin 38 which pivotally supports a forward feeler blade 40. The forward feeler blade 40 is pivotally secured at its upper end to a valve stem 41 of a valve 42, which stem is slidably disposed in a ported valve body 43 having its base pivotally connected to a vertically extending lug 44 secured to the forward portion of the subframe 30. A helical spring 39 has one of its ends connected to a portion of the feeler blade 40 between the point of connection thereto of the valve stem 41 and the point of connection thereto of the pivot pin 38, and has its other end extending through the vertically extending lug 44 and threadedly engaging a turnbuckle element 50. The turnbuckle element 50 is connected through a universal joint 52 to a control linkage 54 which, by means of suitable joint connections, is ultimately connected to a control shaft 56 extending through a mounting plate 58 adjacent the dashboard of the tractor. The end of the control shaft 56 which projects through the mounting plate 58 carries a control handle 60 for a purpose hereinafter described.

Spaced rearwardly along the subframe 30 from the forward end thereof is a horizontally extending pivot pin 62 which has its opposite ends secured to longitudinally extending members 64 and 66 of the subframe 30. Pivotally mounted upon the pivot pin 62 are a pair of downwardly extending feeler blades 68 and 70 which are horizontally spaced from each other along a line which extends transversely with respect to the subframe 30 and substantially normal to the line of forward travel of the tractor 16. The feeler blade 68 has its upper end pivotally connected to a valve stem 72 of a valve 73, which stem is slidably disposed in a ported valve body 74. The ported valve body 74 has its base or end opposite the valve stem 72 secured to a suitable bracket 76. Secured to the feeler blade 68 at a point between its point of connection to the valve stem 72 and the axis of the pivot pin 62 is a helical spring 80 which has a rigid end extended through a plate 82 and threadedly engaging a turnbuckle element 84. The turnbuckle element 84 is connected through a universal joint 86 to a control shaft 88 which extends through the mounting plate 58 hereinbefore described and carries at its upper end a suitable handle 90.

The feeler blade 70 has its upper end pivotally connected to a valve stem 94 of a valve 95, which stem is slidably disposed in a ported valve body 96 which is mounted similarly to the valve bodies 74 and 43, heretofore described, on the subframe 30. A spring 98 interconnects the feeler blade 70 with a turnbuckle element 99 which is in turn connected through a universal joint 100 to a control shaft 102. The control shaft 102 extends through the mounting plate 58 and carries a control handle 104 at the upper end thereof.

Figure 3A:
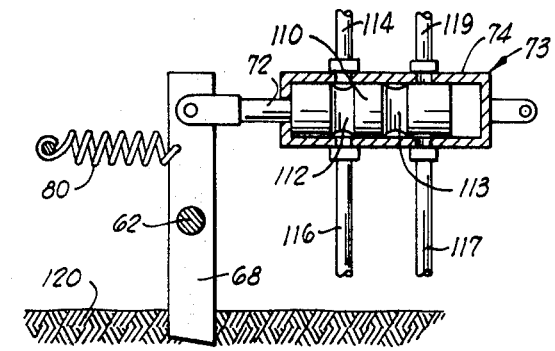
FIGS. 3A and 3B are detail views illustrating the operation of one of the sensing devices forming a part of the invention.
Figure 4A:
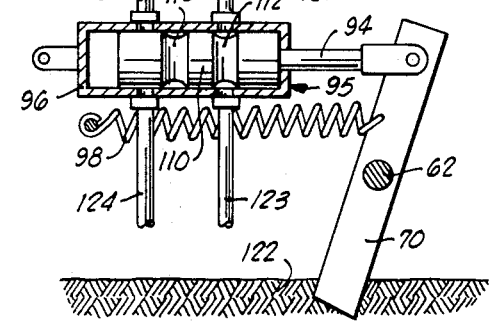
FIGS. 4A and 4B are detail views illustrating the operation of another of the sensing devices forming a part of the invention.
Figures 5A, 5B:
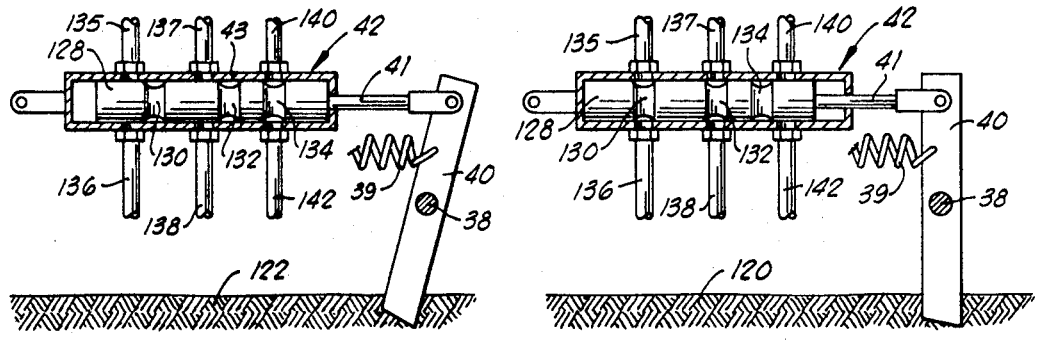
FIGS. 5A and 5B are detail views illustrating the operation of another of the sensing devices forming a part of the invention.

The constructions of the valves 43, 73 and 95 are best illustrated in FIGS. 3A, 4A and 5A where sectional views of these valves are illustrated, in combination with associated movable parts of the apparatus. Thus, in referring to FIG. 3A, it will be noted that the valve 73 includes, in addition to the valve stem 72 and valve body 74, a valve core 110 which has ports 112 and 113 extending therethrough to permit a pair of hydraulic fluid conduits 114 and 116 communicating with the valve body 74 to be placed in communication when the port 112 is aligned with these conduits, and to permit a pair of conduits 117 and 119 to communicate through the core when the port 113 is aligned with these conduits. The feeler blade 68 is shown engaging plowed ground, which is designated by reference numeral 120.

Figure 3B:
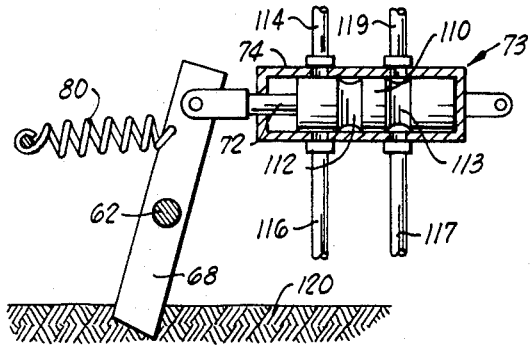

It will be noted in referring to FIG. 3A, that in the case of the valve 73, the feeler blade 68 is pivotally mounted on the pivot pin 62, and the spring 80 is attached to the feeler blade so that the spring tends to bias the valve to the illustrated position. Upon the imposition of a force on the lower end of the feeler blade 68 sufficient to overcome the resilient bias of spring 83, however, the upper end of this feeler blade will be pivoted toward the valve 73 so that the port 113 becomes aligned with the conduits 117 and 119 to permit hydraulic power fluid to pass through this valve. A condition of this type will occur when the feeler blade 68 encounters earth of greater hardness or density than that which it is shown engaging in FIG. 3A. Thus, with the spring 80 set to bias the feeler blade to the illustrated position when this blade is in plowed land 120, the entry of the feeler blade 68 into unplowed land will impress a greater resistance upon the movement through the ground of the lower end of this feeler blade, and will result in the upper end of the blade being pivoted toward the valve body 74 to bring the port 113 into registry with the conduits 117 and 119 as shown in FIG. 3B.

As will be perceived in referring to FIG. 4A, the valve 95 is similarly constructed to the valve 73, and the difference which appertains is in the arrangement of the spring 98 with respect to the downwardly extending feeler blade 70 and with respect to the valve body 96. Thus, in the arrangement depicted in FIGS. 4A and 4B, the feeler blade 70, which normally, as will be hereinafter explained, engages and moves through unplowed earth 122, is pivoted to the position illustrated in 4A due to the high resistance of the unplowed earth to movement of the feeler blade therethrough. This extends the spring 98 and forces the valve to the position illustrated in FIG. 4A in which the conduits 121 and 123 are in communication through the port 112. When, however, the feeler blade 70 passes into plowed land so that the resistance to movement of the feeler blade 70 therethrough is reduced, the feeler blade is biased in a counterclockwise pivotation (as viewed in FIGS. 4A and 4B) by the resilient bias exerted by the spring 98 so that the valve core is pulled to a position in which port 113 is aligned with fluid conduits 124 and 126 which are connected to the valve body 96.

The construction of the valve 42 is best illustrated in FIGS. 5A and 5B of the drawings. As here shown, the valve 42 includes, in addition to the valve body 43 and the valve stem 41, an elongated valve core 128 having three ports 130, 132 and 134 formed through the core at spaced intervals therealong. By reciprocation of the core 128 within the valve body 43, the ports may be positioned so that at one time (as shown in FIG. 5B), the port 130 is aligned with a pair of aligned power fluid conduits 135 and 136 on opposite sides of the valve body, and the port 132 is aligned with power fluid conduits 137 and 138 on opposite sides of the valve body. In an alternate position, the core 128 is moved to the position illustrated in FIG. 5A so that communication between the conduits 135 and 136 and between the conduits 137 and 138 is obstructed, but communication between a conduit 140 and a conduit 142 through the port 134 is effected. The first described position of the valve 42 is effected at a time when the spring 36 has pulled the feeler blade 40 from the position illustrated in FIG. 5A to the position illustrated in FIG. 5B as a result of the passage of the feeler blade from unplowed land into plowed land.

The control handles 60, 90 and 104 and associated control shafts 56, 88 and 102 are provided to permit the tension in the springs 39, 80 and 98 to be adjusted so that the response of the feeler blades 40, 68 and 70 can be adjusted and accommodated to soils of varying density and moisture characteristics.

Figure 6:
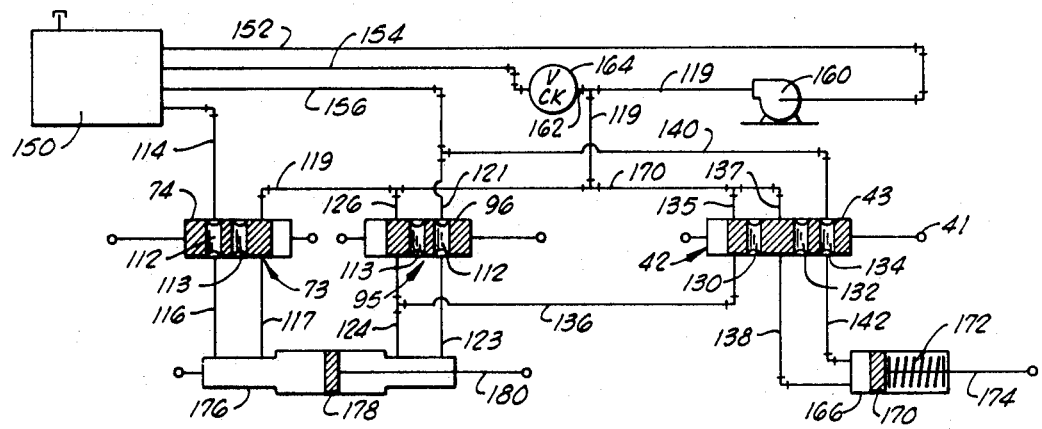
FIG. 6 is a hydraulic flow diagram of hydraulic components which are used in one embodiment of the invention.

The hydraulic system utilized in the embodiment of the invention illustrated in FIGS. 1—5 is best illustrated in detail in the flow diagram appearing in FIG. 6 of the drawings. Here it will be noted that the hydraulic power fluid system includes a reservoir 150 having the fluid conduits 114, 152, 154 and 156 extending therefrom. The conduit 114 extends to the valve 73 as hereinbefore described. The conduit 152 extends to a hydraulic pump 160 which is mounted on the tractor 10 in a suitable location. The hydraulic pump 160 is connected to the conduit 119 hereinbefore described as connected to the valve 73. A branch conduit 162 extends from the conduit 119 through a check valve 164 to the fluid return bypass conduit 154. The conduit 156 is divided so that one branch conduit 121 hereinbefore described is connected to the body 96 of the valve 95. The other branch conduit 140 is connected to the valve 42 in the manner hereinbefore described. Extending from the conduit 119 at a point between the conduit 162 and the valve 73 is a fluid conduit 170 which is connected by the conduits 135 and 137 to the valve 42. The conduit 126 also extends from the conduit 119 and is connected to the valve 95.

The conduits 138 and 142 from the valve 42 are connected to a hydraulic cylinder 166 which has a piston 170 therein biased toward one end of the cylinder by a spring 172, and having a piston rod 174 secured thereto and extending outwardly for suitable connection to the brake mechanism (not shown) associated with the left rear wheel 14b of the tractor 10. The conduits 116 and 117 are connected to one end of a cylinder 176 which contains a piston 178 connected to one end of a piston rod 180 which has its other end adapted for connection to the steering mechanism of the tractor 10 for a purpose hereinafter described. The conduits 123 and 124 are connected to the opposite end of the cylinder 176 from that to which the conduits 123 and 124 are connected.

Figure 7:
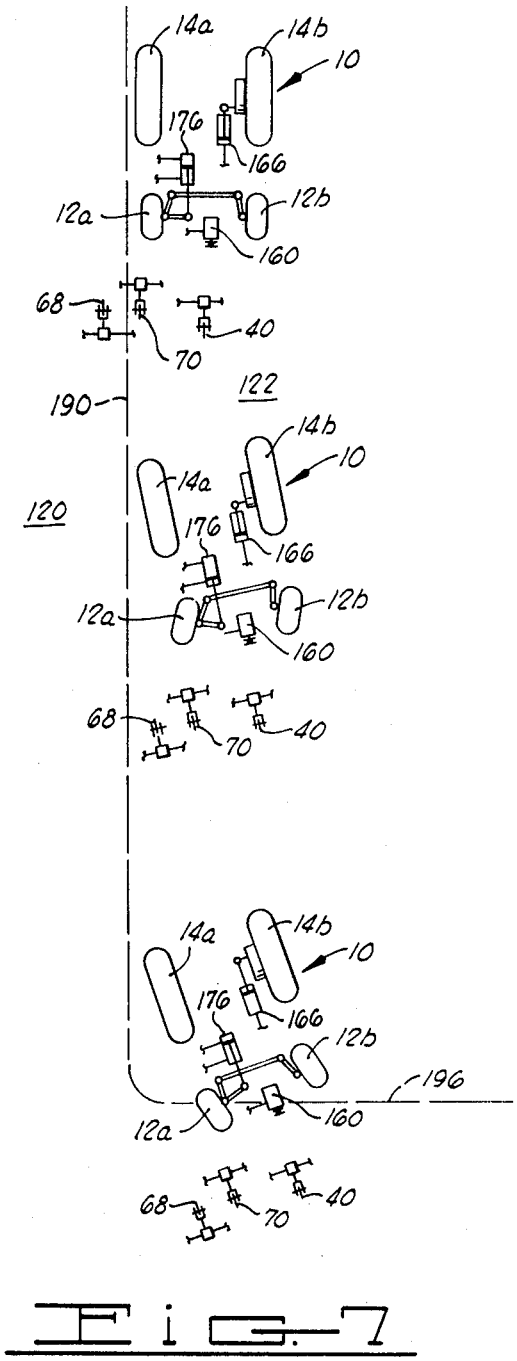
FIG. 7 is a diagrammatic illustration of the way in which the automatic guidance system of the invention operates.

The operation of the automatic guidance system of the invention can best be perceived by referring to FIGS. 3—7 of the drawings. In FIG. 7, the tractor 10 is illustrated as it moves along the edge of a field. The right rear wheel 14a is immediately adjacent the border of the field which is being plowed using a method frequently employed for plowing fields for the purposes of planting crops in areas where large, flat expanses of land exist. Thus, along the line 190, plowed land 120 exists on the left side of this line as viewed in FIG. 7 and unplowed land 122 exists on the right side of this line. The tractor is moving in a straight path along this line 190 so that the plow which is attached to the rear end of the tractor is plowing the unplowed land 122 immediately adjacent the line. It should be further commented that in this method of plowing as it is presently frequently used, the initial plowed swath of land is formed in the configuration of a large rectangle, and then the tractor 10 is driven around the inside of this rectangle along a perimeter of ever-decreasing length so that ultimately the entire field has been plowed.

In the described position of the tractor, the schematically illustrated feeler blade 68 is located on the left side of the line 190 and is moving through the plowed land. The feeler blade 70 is to the right side of the line 190 in unplowed land. Finally, spaced further inwardly in the unplowed land, and preferably slightly ahead of a horizontal, transverse line of alignment on which the feeler blades 68 and 70 are located, is the feeler blade 40. As the tractor 10 moves along the boundary line 190 in this fashion, the feeler blades 68 and 70 remain in the positions depicted in FIGS. 3A and 4A, respectively, so long as the feeler blade 68 is moving in plowed land and the feeler blade 70 is moving through unplowed land. The feeler blade 40 is, in this status of the apparatus, in the position illustrated in FIG. 5A.

Should the tractor 10, for one reason or another, deviate from a course of movement which carries it along the inside of the boundary line 190 and parallel thereto, the feeler blades 68 and 70 and the hydraulic system associated therewith will develop a corrective signal. Thus, for example, if the tractor 10 commences to turn slightly so as to direct its path of movement across the line 190, and toward the unplowed land 120, the effect would be that the feeler blade 68 would be carried out of the plowed land and into the unplowed land before movement in this direction had proceeded very far. As the feeler blade 68 enters the unplowed land, the spring 80 is distended and this feeler blade is pivoted away from the valve to permit the port 113 to become aligned, and in registry with, the conduits 117 and 119. At the same time, the port 112 is removed from its alignment and registry with the conduits 114 and 116. In this status of the valve 73, the hydraulic pump 160 directs hydraulic power fluid from the reservoir 150 through the conduit 119, through the valve 73, through the conduit 124 and into the cylinder 176. It will be noted that none of the power fluid applied to this cylinder 176 in the manner described can be vented via the conduit 116 through the valve 42 since, at this time, the valve core 110 obstructs communication between the conduits 114 and 116.

With the application of power fluid to the left side of the piston 178 of the cylinder 176 as it is illustrated in FIG. 6, the piston is driven to the left so that a corrective force is applied to the steering system of the tractor 10 through the connection therewith of the piston rod 180.

With the movement of the piston 178 to the right in the cylinder 176, fluid is exhausted from this cylinder through the conduit 123, the port 112 in the valve 95, and the conduits 121 and 156 which return the exhausted power fluid to the reservoir 150. The described corrective signal which turns the front wheels 12a and 12b of the tractor 10 in a direction to correct the undesirable deviation from a path parallel to the boundary line 190 continues to be applied until the tractor is moving slightly outwardly with respect to the boundary line 190. Movement in this direction will continue until the feeler blade 68 again crosses the boundary line 190 into the plowed land where the blade will again shift in the softer earth to the position shown in FIG. 3A. The neutral status of the hydraulic system depicted in FIG. 6 will then be restored, due to the communication of the conduits 114 and 116 through the port 112 of valve 73 in conjunction with a centralizing or restorative system which tends to return the wheels to a central position in the absence of a force applied to the wheels to cause a turning movement in one direction or the other. Systems of this type are currently provided on various types of four-wheeled vehicles.

If the tractor 10 should tend to move off course in a direction opposite from that which has been described, that is, toward the outside of the plowed rectangular perimeter, the feeler blade 70 will, as a result of this undesired movement, be carried across the boundary line 190 into plowed land. When this occurs, the lowered resistance to movement through the earth of this land will cause the feeler blade 70 to be pivoted from the position shown in FIG. 4A to the position shown in FIG. 4B. This will throw the valve 95 to a position such that the port 113 through its core is in registry with the fluid conduits 124 and 126. The exact reverse of the fluid flow which has been described as occurring in order to effect corrective movement back toward the outside of the rectangular perimeter will be effected. In other words, the piston 178 is moved in the cylinder 176 toward the left as viewed in FIG. 6 so as to mechanically steer the wheels in the opposite direction from that direction in which the tractor is moving to become misaligned with the boundary 190.

At such time as the tractor 10 reaches a corner of the plowed rectangle, the feeler blade 40, which in most instances will be advanced with respect to the feeler blades 68 and 70 will pass from the unplowed ground into that portion of the plowed ground at the edge of the field which extends normal to the boundary line 190. As the feeler blade 40 moves into the plowed land, it shifts from the status depicted in FIG. 5A to the status depicted in FIG. 5B. This permits hydraulic fluid to be directed by the pump 160 to both the cylinder 176 and to the brake cylinder 166. There then results a shifting of the pistons 170 and 178 within these cylinders to move the piston rods 174 and 180, respectively. As the piston rod 174 of the brake cylinder 166 moves, it effects the application of brakes to the left rear wheel 14b of the tractor so that this wheel is locked, and does not progress further in a forward direction. The movement of the piston 180 causes the front wheels 12a and 12b of the tractor to be turned sharply to the operator's left (as viewed in FIG. 7). Thus, the net effect is for the tractor to undergo a pivoting movement about its left rear wheel 14b to swing the plow carried therebehind through a 90° angle in the corner of the field, and bring the tractor about for heading along the new boundary 196.

Figure 4B:
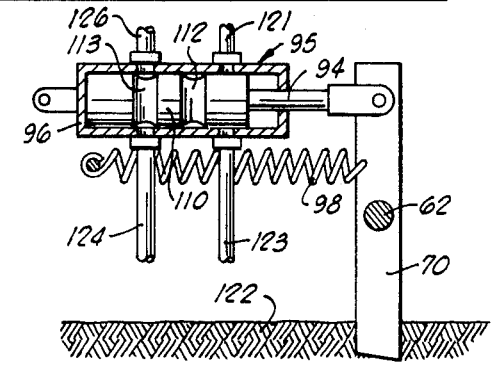

As the tractor 10 swings about on the pivot as described, both the feeler blades 68 and 70 are in the plowed ground so that the valve 73 is in its position illustrated in FIG. 3A, and the valve 95 is in its position illustrated in FIG. 4B. With the valve 95 in this position, hydraulic power fluid is also delivered to the right side of the cylinder 176 (as viewed in FIG. 6) so that this status of the valve 95 is in aid of the force applied to the cylinder piston by hydraulic fluid directed thereto via the valve 42 at this time. The tractor continues to swing about until the feeler blade 40 crosses the boundary 196 and moves back into unplowed land. However, the wheels continue to be turned at this time because, though the feeler blade 40 has reentered unplowed land and the valve 42 is therefore shifted to the position shown in FIG. 5B, the valve 95 is still in its power fluid delivery status as shown in FIG. 4B, and power fluid is therefore still flowing by this route to the right end of the cylinder 176. Thus, the front wheels 12a and 12b continue to be angled to complete the turn, even though the brake applied to the left rear wheel 14b is released at the time when the feeler blade 40 crosses into the unplowed land. Turning thus continues at a slower rate due to freedom of movement of the left rear wheel 14b until the feeler blade 70 has crossed the boundary 196 between the plowed and unplowed land and has entered the unplowed land. At this time, the valve 95 returns to the status depicted in FIG. 4A, and the hydraulic system returns to the status depicted in FIG. 6. Thus, the front wheels 12a and 12b are straightened and recentered, and the tractor is now ready to proceed along the boundary 196 with guidance being effected in substantially the same way as has been described in referring to the travel of the tractor along the boundary 190.

Figure 9:
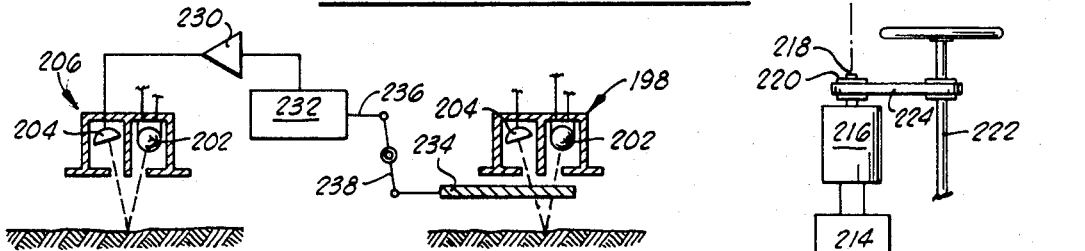
FIG. 9 is a detail schematic view of a portion of the embodiment of the invention illustrated in FIG. 6.
Figure 8:
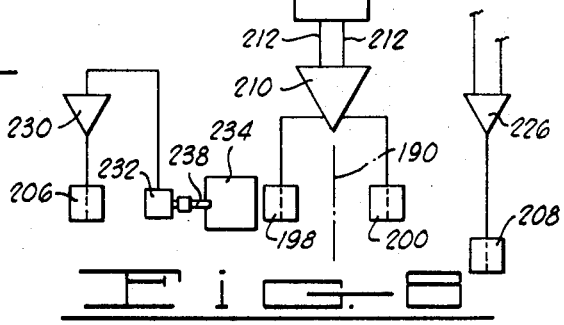
FIG. 8 is a schematic illustration of another embodiment of the invention.

An alternative embodiment of the invention is schematically illustrated in FIGS. 8 and 9 of the drawings. As herein shown, a photoelectric automatic guidance system is employed for originating corrective movements of the tractor 10, and this system includes a pair of photoelectric sensing devices 198 and 200 positioned in the normal path of travel of the tractor 10 on opposite sides of the boundary line 190, and corresponding in position and in general function to the feeler blades 68 and 70 hereinbefore described. Photoelectric sensing devices 198 and 200 are of conventional construction, and may be similar to the unit depicted in U.S. Pat. No. 2,520,680. In such construction, of course, each sensing device includes a light source 202 and a sensor or pickup 204 which senses electromagnetic radiation reflected from the earth. A compensating photoelectric sensing device 206 is positioned in horizontally spaced relation to the sensors 198 and 200 and is spaced well within the plowed land on one side of the boundary 190. The photoelectric sensing device 208 is provided in correspondence to the feeler blade 40 hereinbefore described, and is preferably positioned slightly ahead of the horizontal line along which the photoelectric sensing devices 198, 200 and 206 are located.

The output from the pickup units 204 of the sensing devices 198 and 200 are fed to a comparison amplifier 210 where the signals from the two sensing devices 198 and 200 are balanced against each other, and an output signal is developed which is passed through suitable electrical leads 212 to a control box 214 from which a signal is transmitted to a bidirectional (reversible) servomotor 216. An arrangement of the general type depicted in FIG. 8 as here described is shown in U.S. Pat. No. 3,395,771. The bidirectional servomotor 216 carries an output shaft 218 having a pulley 220 keyed thereto for driving the steering column 222 of the tractor in rotation through a suitable continuous belt 224.

The photoelectric sensing device 208 develops a signal which is transmitted to an amplifier 226, and the output signal from the amplifier 226 is converted to mechanical signals or forces employed for applying the brake to the left rear wheel 14b of the tractor 10, and to the steering mechanism of the tractor in any suitable manner to accomplish the corner turning function hereinbefore described.

The photoelectric sensing device 206, which is a background compensating device as hereinafter described, is connected through a suitable amplifier 230 to a servo device, such as a solenoid 232, which functions to selectively more a filter plate 234 in a horizontal direction. The armature 236 of the solenoid 232 is connected to the filter plate 234 through a suitable linkage 238 (see FIG. 9). The filter plate 234 is constructed so that it is substantially transparent along the side thereof which is closest to the photoelectric sensing device 198 and then becomes increasingly translucent (more nearly opaque) in a graduated fashion toward the left side (or side most distantly located with respect to the sensing device 198).

The function of the background compensating device 206, the amplifier 230, solenoid 232 and filter plate 234 associated therewith is to compensate for anomalies in the background level of reflectivity of the soil so that a true and useful reading can be continuously obtained from the sensing device 198. For example, let it be assumed that the sensing devices 198 and 200, amplifier 210, control box 214 and bidirectional servomotor 216 are set so that a corrective signal will be applied to the steering system of the tractor at a time when a certain minimum light intensity difference is not characteristic of the difference in the intensity of light reflected from the soil beneath the sensing devices 198 and 200. The operational effectiveness of the automatic control system will be destroyed if an anomaly in the plowed land is encountered in which its reflectivity increases sharply to reduce the difference in reflectivity existing between the plowed and unplowed land to a value such that the system reacts as if the photoelectric sensing device 198 had crossed the boundary 190 to the unplowed side thereof.

To compensate for such anomalies, the background compensator sensing device 206 is provided. Thus, when the described anomaly is encountered, the sensing device 206 "sees" this substantial increase in reflectivity of the plowed land, and the corresponding signal which is developed by this device is amplified by the amplifier 230 and passed to the solenoid 232. This signal of increased magnitude causes solenoid 232 to be actuated so that the filter plate 234 is extended a distance beneath the photoelectric sensing device 198 which is proportional to the magnitude of the received signal. In other words, the filter plate 234 is moved beneath the photoelectric sensing device 198 by an amount which is correlated to the increase in light reflectivity as detected by the background compensator sensing device 206. With a very extreme increase in the reflectivity of the plowed land, the filter plate 234 is moved a substantial distance across and beneath the photoelectric sensing device 198. This brings beneath the sensing device, a portion of the filter plate 234 which has a relatively low light transmission quality, and which thus reduces the intensity of light impinging upon the pickup element 204 of the sensing device 198. Thus, the light intensity of the reflected light sensed at the sensing device 198 is maintained at a compensated, relatively lower level than that which would actually appertain at that location were the filter plate 234 not employed, and the setting of values for the obtainment of corrective steering signals which has been preset into the amplifier 210, control box 214 and bidirectional servo motor 216 remains a proper setting effective to steer the tractor in the manner desired. A similar background compensating sensing device with associated filter plate may be provided for developing an adequate compensated signal at the corner turning sensing device 208 so that this sensing device will operate effectively at a time when it crosses the boundary between the unplowed and plowed land at the corner of the field.

Figure 11:
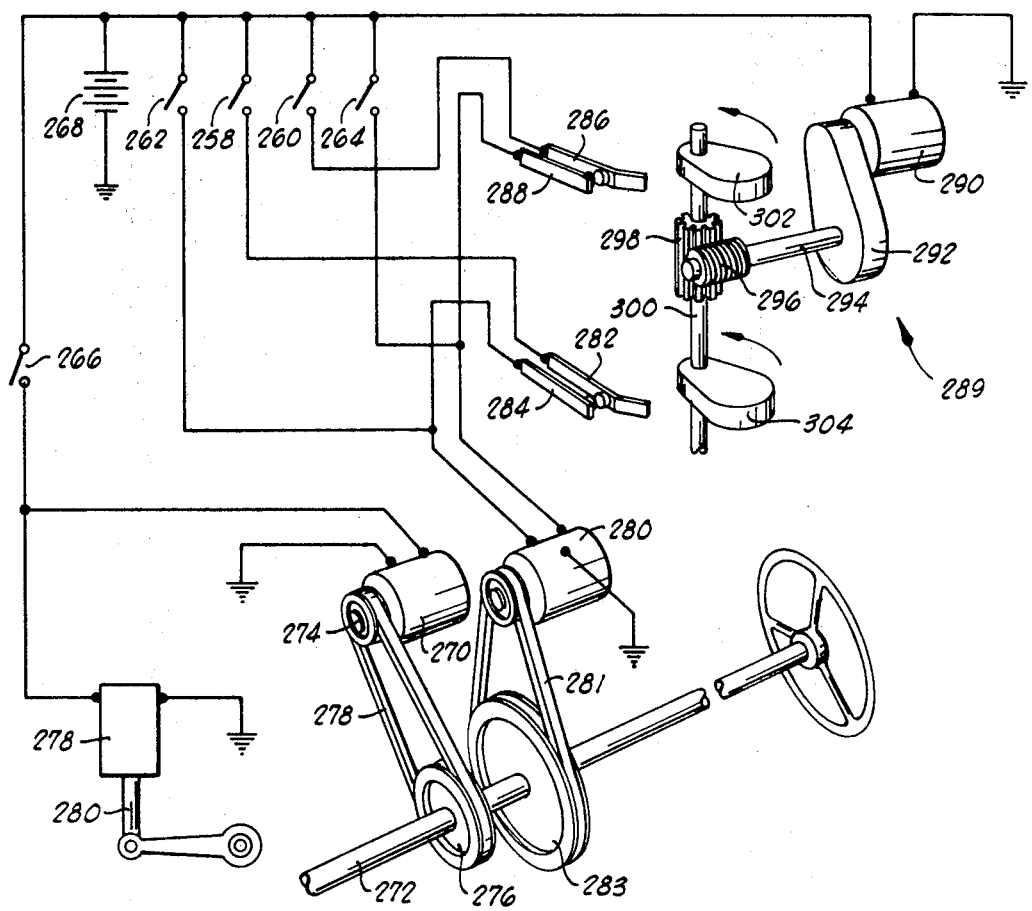
FIG. 11 is a schematic electromechanical diagram of the steering control system utilized in the embodiment of the invention illustrated in FIG. 10.
Figure 10:
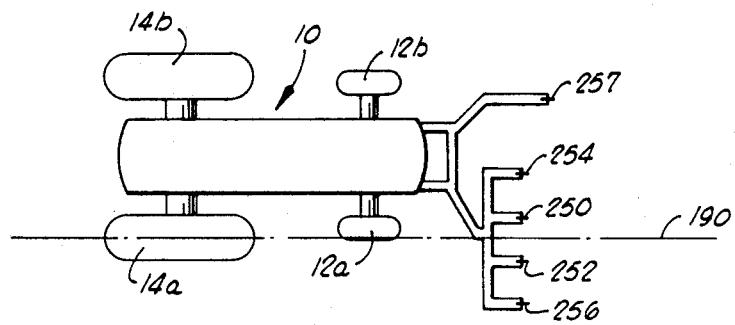
FIG. 10 is a schematic illustration of yet another embodiment of the invention.

Another embodiment of the invention is depicted in FIGS. 10 and 11 of the drawings. It is desirable to provide in the automatic steering control system of the invention, compensating devices which may be used to reduce or eliminate the hunting or Dutch wobble which can occur where the corrective sensing devices are in no way damped, and their signals to the steering and braking systems of the tractor are susceptible to time delays of a substantial magnitude. One technique for reducing the hunting tendency is the use of a system of the type depicted in FIGS. 10 and 11 of the drawings. Here, in addition to the feeler blades, photoelectric cells or sensing devices which have been described as located on the opposite sides of the boundary 190 when the tractor is on course (these being designated by reference numerals 250 and 252), there are also provided a pair of additional feeler blades or sensing devices 254 and 256 also located on the opposite sides of the boundary line between the plowed and unplowed areas.

The sensing devices 250, 252, 254 and 256 are connected to electrical switches 258, 260, 262 and 264, respectively. The switch 266 is connected to a sensing device 257 which corresponds in location and function to the feeler blade 40 shown in FIGS. 1 and 2. All the switches 258–266 are connected by suitable electrical circuitry to a battery 268. The switch 266 is connected directly to a relatively high-speed motor 270 which is drivingly connected to the steering shaft 272 of the tractor 10 by means of suitable sprockets or pulleys 274 and 276, and by a chain or belt 278. The switch 266 is also connected to a solenoid 278 which, when actuated, acts through a suitable mechanical linkage to set the left rear brake of the tractor 10.

The switch 262 which is operated by the sensing device 254, which is located relatively further inside the boundary line 190 between the plowed and unplowed land than is the sensing device 250, is connected directly to a reversible motor 280 for energizing this motor for rotation in one direction when the switch 262 is closed. The motor 280 is connected through a belt 281 to a pulley 283 keyed to the steering shaft 272. In like manner, the switch 264 is connected to the sensing device 256 located furthest inside the plowed ground, and this switch is connected to the reversible motor 280 in a manner to drive the reversible motor in the opposite direction from that in which it rotates when the switch 262 is closed at such time as the switch 264 is closed.

The switches 258 and 260 are connected to the sensing devices 250 and 252, respectively, which are nearest adjacent the boundary line 190 between the plowed and unplowed land. The switch 258 is connected to a movable switch contact 282 which can be moved into contact with a stationary contact 284. The stationary contact 284 is connected to the reversible motor 280 in a manner to drive the reversible motor in the same direction of rotation as it is driven by closure of the switch 262 at such time as the movable contact 282 is moved against the stationary contact 284. The switch 260 is connected by an electrical lead to a movable contact 286 which is positioned for movement against, and contact with, a stationary contact 288. The stationary contact 288 is connected to the reversible motor 280 in a manner to drive the motor in the same direction of rotation as it is driven by closure of the switch 264.

Mounted on the tractor 10 in a suitable manner adjacent the movable contacts 282 and 286 is a secondary switching system 289 which, in the illustrated embodiment, includes a motor 290 which is constantly driven during operation of the tractor and which, through a suitable gear reducer 292, drives a shaft 294 which carries a worm 296. The worm 296 engages a worm gear 298 mounted on a shaft 300 which carries at its opposite ends, a pair of cams 302 and 304.

As has been previously explained, the switches 258 and 260 are associated with, and operated by, sensing devices 250 and 252 which are located relatively closely to each other on the opposite sides of the boundary line 190 between the plowed and unplowed ground. The sensing device 250 is located over the unplowed ground and the sensing device 252 is located over the plowed ground. The switches 262 and 264 are associated with sensing devices 254 and 256, respectively, located on opposite sides of the sensing devices 250 and 252, and are respectively relatively further inwardly of the unplowed land and outwardly in the plowed land. The switch 266 is associated with the sensing device 257 which is located forwardly of a transverse line of alignment of the sensing devices 252—256, and is spaced relatively far to the left of these two devices or, stated differently, relatively far inwardly in the unplowed land.

In this arrangement, the switches 258 and 260 are intended to provide minor, relatively gentle, course corrections, while the switches 262 and 264 are intended to provide large corrective movements to maintain the proper path of travel of the tractor. When switch 262, which is relatively further from the boundary line 190 between plowed and unplowed land, is closed as a result of a large deviation of the tractor 10 from the desired course, a circuit is made directly to the reversible motor 280. The motor 280 will, through the belt 281, drive the pulley 283 connected to the steering shaft 272 in a direction such that the forward wheels 12a and 12b of the tractor 10 are turned to bring the tractor back to the proper position, and to correct the drift or misalignment which has occurred. The same action occurs, only with the effect of driving the reversible motor 280 in the reverse direction, when the switch 264 is closed as a result of its sensing device 252 traversing the boundary line 190 between plowed and unplowed land.

When either of the switches 258 or 260 are closed as a result of the transit of their respective sensing devices 250 and 252 across the boundary line 190, a relatively minor deviation from the desired course by the tractor 10 has usually occurred at this time. Thus, it is not desired to introduce a corrective signal of large magnitude to the steering column 272 in order to overcome or correct for this type of deviation from course. With the closure of either of these switches 258 or 260, an electrical circuit is made through the respective movable contacts 286 and 282 to which they are connected at such time as these movable contacts are pushed by the revolving cams 302 and 304 against the stationary contacts 288 and 284. At this time, the reversible motor 280 will be energized and driven in the proper direction for a relatively short period of time, so that a small corrective movement is imparted to the front wheels 12a and 12b of the tractor. It may be pointed out that, though the shaft 300 is shown being constantly driven by a mechanical connection to the electrical motor 290, it may also be constantly driven by a mechanical connection to the drive chain of the tractor, thus producing a constant number of turns of the shaft 300 per foot of forward travel of the tractor, thus obtaining a better correlation between the corrective signal input to the reversible motor 280 in relation to the speed of the tractor.

It will be perceived that the effect of the use of the secondary switching system 289 formed by the movable contacts 282 and 286, and the stationary contacts 284 and 288 is to permit intermittent or impulse closing of the circuit to the reversible motor 280 at such time as deviations from the desired course are indicated by the sensing devices 252 and 250. The intermittent control of the steering shaft 272 can be adjusted by adjusting the rotational speed of the shaft 300, and the dwell time of the cams 302 and 304 so that optimum corrective action for the relatively fine or gentle control intended to be afforded by the electrical circuitry associated with the sensing devices 250 and 252 is obtained.

The sensing device 257 corresponds in function to the feeler blade 40 hereinbefore described. Thus, when the end of the field is reached and the sensing device 257 crosses the boundary line 196 between plowed and unplowed land, the switch 266 is closed. A circuit is then made to the solenoid 278, and simultaneously to the motor 270, so that the left rear wheel 14b will be braked and the front wheels 12a and 12b turned sharply to the left.

In addition to the fine and coarse electrical steering control provided by the embodiment of the invention illustrated in FIGS. 10 and 11, and functioning to reduce hunting or Dutch wobble, it should be pointed out that other control circuitry or devices can be employed for this purpose. For example, where the hydraulic control valves hereinbefore described are employed, the orifices or ports formed through the cores thereof are made relatively small in the case of the valves which would be connected to the feeler blades corresponding to the sensing devices 252 and 250. The result of the corrective signal being developed in the hydraulic system by the feeler blades represented by the sensing devices 250 and 252 is then to effect only a relatively minor or small corrective change in the tractor's course. Feeler blades corresponding to the sensing devices 254 and 256, on the other hand, are connected to hydraulic control valves having relatively large ports through the cores thereof so that larger magnitude signals are developed when these feeler blades pass across the boundary line 190 and shift their respective hydraulic control valves. These larger magnitude signals will result in a more drastic or severe course change being developed only at such time as the wandering or deviation of the tractor 10 from its desired course is sufficiently great to carry either the feeler blade corresponding to the sensing device 254, or the feeler blade corresponding to the sensing device 256, across the boundary line 190 into either the plowed or unplowed land, as the case may be.

Although certain preferred embodiments of the invention have been herein described in order to provide an example of its operation sufficient to permit those skilled in the art to practice the invention, it is to be understood that various modifications and changes can be made in the depicted and described system without departure from the basic principles of the invention. For example, infrared sensing devices of types well known to the prior art may be employed, rather than the photoelectric or mechanical sensing devices herein described, since it is known that the infrared radiation of plowed land differs substantially from that of unplowed land. All changes and innovations of this type, which continue to rely upon the basic principles herein described, are deemed to be circumscribed by the spirit and scope of the invention.

What I claim is:

1. An automatic guidance system for farm tractors having a pair of rear wheels and at least one forward wheel comprising:
   a supporting frame adapted for mounting on the forward portion of the tractor;
   first and second horizontally spaced sensing devices mounted on said frame and extending downwardly therefrom, said sensing devices being positioned on opposite sides of a line extending substantially parallel to the line of forward travel of said tractor, and each being capable of sensing the difference between plowed and unplowed land;
   means adapted for connection between the forward wheels of the tractor and the first and second sensing devices for turning the forward wheels in one direction when said first sensing device moves from a position over plowed land to a position over unplowed land, and for turning the forward wheels in an opposite direction when said second sensing device moves from a position over unplowed ground to a position over plowed ground;
   a third sensing device mounted on said frame and spaced horizontally from said first and second sensing devices, said third sensing device being disposed on the same side of said line parallel to said line of forward travel as is said second sensing device; and
   means adapted for connection between the braking system of the tractor, the forward wheels of the tractor, and said third sensing device for applying a brake to one of the rear wheels of the tractor and simultaneously turning the forward wheels of the tractor said opposite direction when said third sensing device moves from a position over unplowed ground to a position over plowed ground.

2. An automatic guidance system as defined in claim 1 wherein said first and second sensing devices each comprises a feeler blade extending downwardly from said frame into the earth.

3. An automatic guidance system as defined in claim 2 wherein said means for turning the forward wheels comprises:
   a hydraulic pump;
   a source of hydraulic power fluid connected to said hydraulic pump;
   a cylinder and piston assembly having the piston thereof adapted for connection to the steering mechanism of the tractor;
   conduit means connecting said hydraulic pump to said cylinder for driving the piston in or out of said cylinder when hydraulic power fluid is applied to said cylinder; and
   valve means connected in said conduits and responsive to said first and second sensing devices for directing power fluid to an end of said cylinder dependent on the signal communicated to said valve means by one of said first and second sensing devices.

4. An automatic guidance system as defined in claim 3 wherein said means for applying the brake and for simultaneously turning the forward wheels comprises:
   a hydraulic pump;
   a source of hydraulic power fluid connected to said pump;
   a valve connected to said pump for receiving power fluid therefrom, and connected to said third sensing means to be thrown by said third sensing means when said third sensing means moves from plowed to unplowed land;
   a first piston and cylinder assembly connected to said valve for receiving power fluid therefrom, and having the piston thereof adapted for connection to the steering system of the tractor; and
   a second piston and cylinder assembly connected to said valve for receiving power fluid therefrom, and having the piston thereof adapted for connection to the brake of one of the rear wheels of the tractor.

5. An automatic guidance system as defined in claim 4 and further characterized as including means for compensating said sensing devices for anomalous characteristics of the earth.

6. An automatic guidance system as defined in claim 5 wherein said means for compensating said sensing devices comprises:
   a background-sensing device for sensing a background characteristic of the earth; and
   means for adjusting the sensitivity of at least one of said first, second or third sensing devices in response to variations in said background characteristic as sensed by said background-sensing device.

7. An automatic guidance system as defined in claim 6 wherein said automatic guidance system further comprises:
   fourth and fifth sensing devices mounted on said frame in horizontal alignment with said first and second sensing devices, and said first and second sensing devices being positioned between said fourth and fifth sensing devices, said fourth and fifth sensing devices each being capable of sensing the difference between plowed and unplowed land;
   coarse steering control means connected to said fourth and fifth sensing devices and adapted for connection to the forward wheels of the tractor for turning the forward wheels in one direction when said fourth sensing device moves across a boundary between plowed and unplowed land, and for turning the forward wheels in an opposite direction when said fifth sensing devices moves from a position over unplowed land to a position over plowed land, the turning movements of said forward wheels effected by said coarse steering means being greater than the turning movements of said forward wheels effected by said first mentioned turning means.

8. An automatic guidance system as defined in claim 1 wherein said sensing devices are photoelectric sensors.

9. An automatic guidance system as defined in claim 1 wherein said means for turning the forward wheels comprises:
   a hydraulic pump;
   a source of hydraulic power fluid connected to said hydraulic pump;
   a cylinder;
   a piston rod extending from said cylinder and adapted for connection to the steering mechanism of the tractor;
   a first valve connected to said first sensing device and openable when said first sensing device moves from plowed to unplowed land;
   fluid conduits connected through said first valve between one end of said cylinder and said pump;
   a second valve connected to said second sensing device and openable when said second sensing device moves from unplowed to plowed land; and
   fluid conduits connected through said second valve between a second end of said cylinder and said pump.

10. An automatic guidance system as defined in claim 1 wherein said means for applying a brake and turning the forward wheels comprises:
    a hydraulic pump;
    a source of hydraulic power fluid connected to said pump;
    a valve connected to said pump for receiving power fluid therefrom, and connected to said third sensing means for responding thereto by shifting said valve;
    a first piston and cylinder assembly connected to said valve for receiving power fluid therefrom, and having the piston thereof adapted for connection to the steering system of the tractor; and a second piston and cylinder assembly connected to said valve for receiving power fluid therefrom and having the piston thereof adapted for connection to the brake of one of the rear wheels of the tractor.

11. An automatic guidance system as defined in claim 1 and further characterized to include means for compensating said sensing devices for anomalous characteristics of the earth.

12. An automatic guidance system as defined in claim 11 wherein said means for compensating said sensing devices comprises:
a background-sensing device for sensing a background characteristic of the earth; and
means for adjusting the sensitivity of at least one of said first, second or third sensing devices in response to variations in said background characteristic as sensed by said background-sensing device.

13. An automatic guidance system as defined in claim 1 and further characterized to include means for reducing hunting due to overresponsiveness of said means for turning said wheels.

14. An automatic guidance system as defined in claim 13, wherein said means for reducing hunting comprises:
fourth and fifth sensing devices mounted on said frame in horizontal alignment with said first and second sensing devices, with said first and second sensing devices positioned between said fourth and fifth sensing devices, said fourth and fifth sensing devices each being capable of sensing the difference between the plowed and unplowed land;
coarse steering control means connected to said fourth and fifth sensing devices and adapted for connection to the forward wheels of the tractor for turning the forward wheels in one direction when said fourth sensing device has crossed the boundary between plowed and unplowed land, and for turning the forward wheels in an opposite direction when said fifth sensing device moves from a position over unplowed ground to a position over plowed ground, the turning movements of said forward wheels effected by said coarse steering means being greater than the turning movements of said forward wheels effected by said first mentioned turning means.

15. In a farm tractor having a plow pulled thereby, and having a pair of rear wheels, brakes for each of said rear wheels, and at least one forward wheel, the improvement which comprises:
first sensing means for contacting the earth along opposite sides of a relatively straight boundary between plowed and unplowed earth;
means mounting said first sensing means on said tractor for contacting the earth on opposite sides of said boundary when said tractor is steered along said boundary in a direction of travel which is aligned with, or parallel to, said boundary;
means mounted on said tractor and responsive to signals developed by said first sensing means when said first sensing means contacts the earth on only one side of said boundary for turning said forward wheels in a direction to return said sensing means to a position in which it contacts the earth on opposite sides of said boundary;
second sensing means mounted on said tractor in spaced relation to said first-mentioned sensing means and contacting the earth on one side of said boundary at a location which is forward of said first sensing means and on opposite sides thereof from said forward wheels; and
means mounted on said tractor and responsive to a signal developed by said second sensing means when said second sensing means crosses a boundary between plowed and unplowed land and for applying a brake to one of said rear wheels and simultaneously turning said forward wheels in a direction with respect to said boundary corresponding to the direction which the point of earth contact of said second sensing means lies with respect to said first-mentioned relatively straight boundary to thereby pivot the tractor about said one rear wheel.

16. The improvement defined in claim 15 wherein said first sensing means comprises:
a first sensing device for sensing electromagnetic radiation transmitted thereto from the earth and developing a signal proportional to the amplitude of the sensed radiation; and
a second sensing device horizontally spaced from said first sensing device for sensing electromagnetic radiation transmitted thereto from the earth and developing a signal proportional to the amplitude of the sensed radiation.

17. The improvement defined in claim 16 wherein said means responsive to signals developed by said sensing means comprises:
a bidirectional servomotor; and
drive means drivingly connecting said motor to the front wheels of a tractor for turning the wheels as the motor is turned.

18. The improvement defined in claim 16 wherein said first sensing means comprises:
a first feeler blade mounted pivotally on said mounting means and extending downwardly therefrom below a plane tangent to said rear wheels and front wheels; and
a second feeler blade pivotally mounted on said mounting means and extending downwardly therefrom below a plane tangent to said rear wheels and front wheels.

19. The improvement defined in claim 16 wherein the first sensing means further comprises:
means for resiliently biasing said first feeler blade to a first position when said first feeler blade is in plowed land, and for yielding when said first feeler blade is in unplowed land and is in a second position;
means for resiliently biasing said second feeler blade to a first position when said second feeler blade is in plowed land, and for yielding when said first feeler blade is in unplowed land and is in a second position;
a first valve connected to said first feeler blade and having a first, open position when said first feeler blade in in said second position, and having a second, closed position when said first feeler blade is in said first position; and
a second valve connected to said second feeler blade and having a first, open position when said second feeler blade is in said first position, and a second, closed position when said second feeler blade is in said second position.

20. An automatic guidance system for farm tractors having a pair of rear wheels and at least one forward wheel comprising:
a supporting frame adapted for mounting on the forward portion of the tractor;
first and second horizontally spaced sensing devices mounted on said supporting frame and facing downwardly therefrom, said sensing devices being positioned on opposite sides of a line extending substantially parallel to the line of desired forward travel of said tractor, and each sensitive to a characteristic which varies between plowed and unplowed ground;
means adapted for connection between at least one wheel of the tractor and the first and second sensing devices and responsive to signals developed by said sensing devices for turning said one wheel in one direction when said first sensing device moves from a position over plowed ground to a position over unplowed ground, and for turning at least one wheel of the tractor in an opposite direction when said second sensing device moves from a position over unplowed land to a position over plowed land;
a third sensing device mounted on, and facing downwardly from, said frame and spaced horizontally from said first and second sensing devices, said third sensing device being disposed on the same side of said line parallel to said line of desired forward travel as is said second sensing device, and being sensitive to a characteristic which varies between plowed and unplowed land; and means adapted for connection between the braking system of the tractor, at least one wheel of the tractor, and said third sensing device for applying a brake to one of the rear wheels of the tractor and simultaneously turning the tractor in a direction to move said third sensing device away from said line parallel to said line of desired forward travel by wheel movement when said third sensing device moves from a position over unplowed ground to a position over plowed ground.